July 24, 1962
C. B. FORRESTER
3,045,943
LINE WINDING DEVICE
Filed May 19, 1960
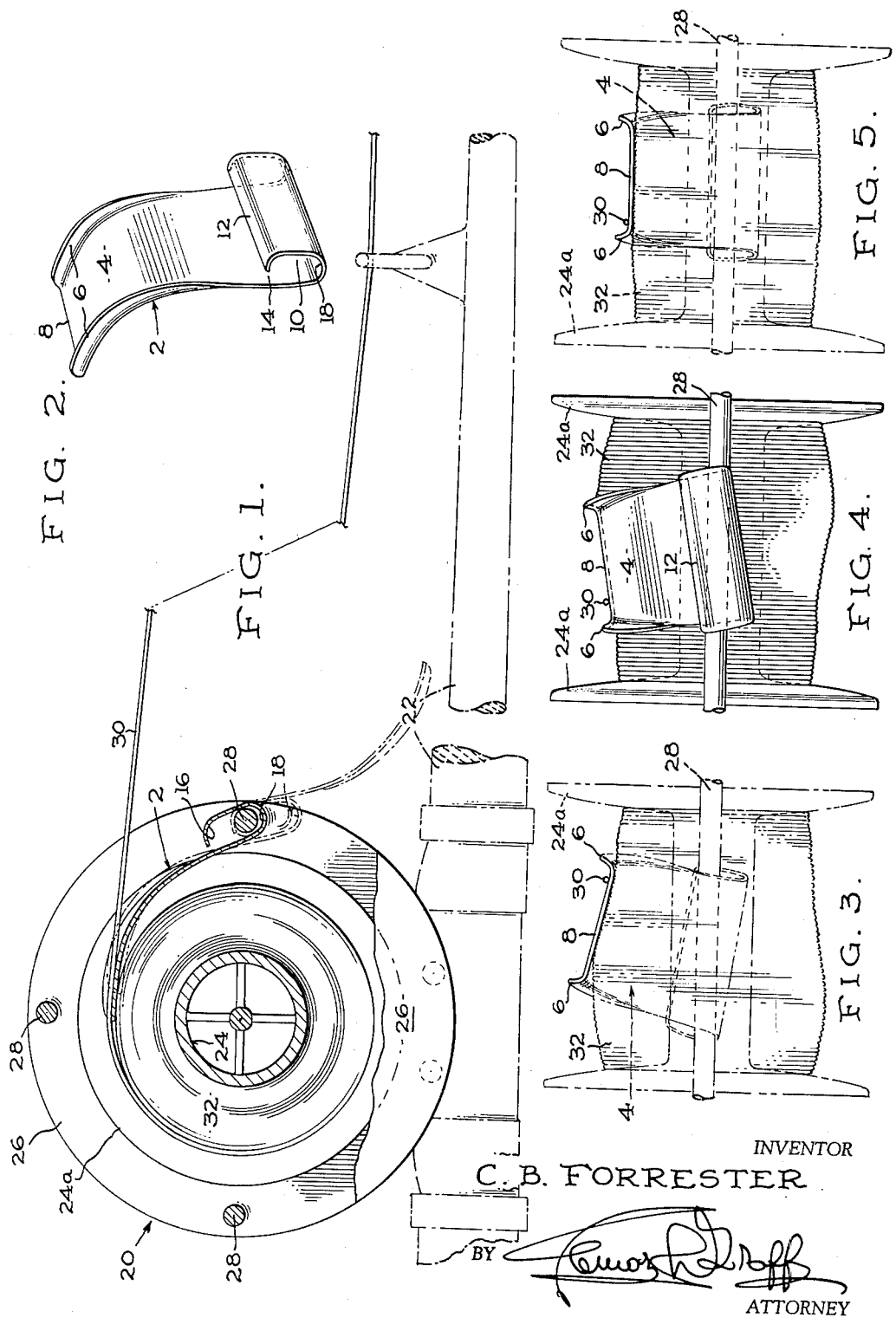
INVENTOR
C. B. FORRESTER
BY
ATTORNEY

United States Patent Office 3,045,943
Patented July 24, 1962

3,045,943
LINE WINDING DEVICE
Clive B. Forrester, 10301 SW. 69th Ave., Miami 56, Fla.
Filed May 19, 1960, Ser. No. 30,156
3 Claims. (Cl. 242—84.43)

This invention relates generally to a line control apparatus for reels and more particularly to a line winding device for fishing reels of the rotating spool type.

Many light tackle reels feature so-called built-in level wind means. The most common such means comprises a traversing line guide propelled back and forth across the spool by means of a rotating shaft having a pair of reverse pitched spiral threads. A similar device, of sufficiently rugged construction for use with the larger reels as used in heavy or deep sea fishing, would be too costly besides adding undesirable weight to the already relatively bulky frame of the larger reels.

Experienced ocean fishermen are able to cope with the level wind problem as the retrieve is usually sporadic and slow, leaving time to guide the line back and forth on the spool with the thumb. However, it is often difficult for the inexperienced newcomer, often women, and older men to manipulate the incoming line by hand as all their attention and efforts are devoted to bringing in their strike.

Attempts have been made to provide suitable level winding devices for heavy tackle reels but their operation for the most part has been found unsatisfactory. One such device, for instance, is operable only when the line is under tension and therefore, when the fish is rapidly moving towards the operator and it is necessary to reel in fast, the line slackens and the required tension is not available to actuate the leveling mechanism.

The present invention does not require a positive drag on the line in order to function, but only requires the usual friction of the line drawing through the water to supply the necessary tension.

Accordingly, one of the objects of the present invention is to provide a line winding attachment for a fishing reel which is actuated solely and automatically by the friction of the line being drawn through the water so that the reeled in line is substantially uniformly distributed across the spool and possesses a slight crown.

Another object is to provide a level wind device comprising a unit in the form of a single member having no separate moving parts, and which is very inexpensive to produce, simple to handle, and easily stored.

The invention further comprehends the provision of a line winding apparatus which may be sold over the counter to present owners of heavy tackle reels and can thereafter be installed in a second without the necessity of any tools.

Still a further object of the invention is the provision of a winding attachment for reels having means for automatically engaging and disengaging the device whenever the line is reeled in or played out, respectively.

Another object of the invention is to provide a line winding device for reels which will produce a slight "crowning" of the line on the spool in order to minimize any concentrated build-up of pressure against the flanges of reel spools as caused by modern monofilament lines.

These and further objects and advantages of the invention will become apparent as the following description proceeds, taken in connection with the accompanying drawings, wherein similar reference characters designate corresponding parts throughout the several views of the drawing:

FIGURE 1 is a side elevation partly in section and illustrating the invention as applied to a fishing reel.

FIGURE 2 is a perspective view of a level wind attachment embodying the invention.

FIGURE 3 is a diagrammatic rear view of the invention and shows only the spool and a frame post of the reel assembly to illustrate the automatic following action of the level wind device.

FIGURE 4 is a front view of the device as shown in FIGURE 3.

FIGURE 5 is a diagrammatic rear view similar to FIGURE 3 but illustrating the coiled line in na substantially level position.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration of its various novel features, the invention has been shown herein as embodied in a winding attachment for a fishing tackle reel. It is to be understood that I contemplate the utilization of the principles of this invention in any winding or reeling device wherein the same may be found to be applicable.

Referring to the drawings in detail, FIGURE 2 most clearly illustrates the level wind plate per se which is generally designated as 2. The plate 2 is preferably formed from sheet stainless steel or chrome plated brass in order to resist corrosion from the salt or fresh water to which it will be subjected.

The body of the plate 2 is arcuate in cross section and includes at its upper end a guide channel 4 defined between upturned guide walls 6 which extend to a lip 8 at the extreme upper end of the plate. The lower end of the plate is bent back upon itself to form an elongated slot or loop 10 adjacent the bottom of the plate. The bottom edge 12 of the plate is preferably spaced apart from the body portion to form an opening 14 therebetween. It will thus be seen that the inturned edge 12 forms a top wall 16 inside the loop 10 which is oppositely disposed from bottom wall 18 of the loop.

FIGURE 1 illustrates the level wind plate attached to a typical tackle reel 20 which is shown mounted on a rod 22. The reel includes a spool 24 journalled between a pair of side frames 26 which are in turn connected to one another in spaced apart relationship by means of frame posts 28.

The level wind plate is attached to the reel 20 by merely inserting the frame post 28 at the front of the reel through the opening 14 in the plate. The inherent resiliency of the plate material permits the post 28 to "snap" into the loop 10 of the plate. Thereafter, the loop 10 moves freely on the post 28 and the top and bottom walls 16 and 18 respectively of the loop 10 define the limits of vertical movement of the plate.

The line 30 leading from the spool 24 is fed from the top of the spool and through the guide channel 4 to the forward end of the fishing rod 22. The channel portion 4 of the plate is curved to a sufficient degree so that the lip 8 will at all times be the primary point of contact between the plate and line 32 which is coiled around the spool 24. It will be noted that the radius of the arcuate plate is at least as great as the radius of the spool 24.

The length of the plate is calculated so that the lip 8 will contact the spooled or coiled line 32 at the point at which the feed line 30 diverges from the coiled line 32.

FIGURE 1 illustrates the attached position of the level wind plate both during reeling and unreeling of the line 32. The full section lines disclose the plate in its operable position or as it appears during the reeling in of the line 30. The plate is automatically raised such that the lip 8 is drawn into the convergence of line 30 and the spooled line 32. Two factors contribute to this wedging action;

the friction on the underside of the lip 8 caused by the rearwardly rotating spooled line 32, and the friction on the channel 4 of the incoming line 30 which is also moving rearwardly in the same direction as the rotating spool. If the line 30 is suddenly reversed by a running fish, it will be apparent that the forward rotation of the coiled line 32 together with the forward running of line 30, will combine to push the lip 8 out of its position between the convergence of line 30 and spooled line 32. The disengaged position of the plate is shown in broken lines in FIGURE 1 wherein it will be noted the plate is supported at its lower end by means of the top wall 16 of the loop 10 which is resting upon the forward frame post 28. As soon as the running reel is stopped and the line is again reeled in, the lip 8 will be immediately drawn upwardly and rearwardly to engage the level wind plate.

The actual winding operation is as follows. If the spool of line 32 is substantially level as in FIGURE 5 and the line 30 is feeding in at the point indicated, then it would not take long before the spooled line 32 would appear as in FIGURE 3 with a raised portion directly below the point where line 30 had been feeding onto the spool. But as the coiled line 32 raises up at the point under line 30, the lip 8 is, of course, raised in turn. There is no resistance to this twisting or pivoting of the plate as the change in inclination is entirely absorbed by the loop 10 as shown in FIGURES 3 and 4.

As the left side of the spool in FIGURE 5 is enlarged and the corresponding side of the plate is lifted upwardly, the normal tension on the line 30 caused by the drag of the line through the water pulls the line across the channel 4 to its lowest point. In this manner, the line 30 is constantly urging the lip 4 to settle into the lowest trough along the top of the spooled line. It will be evident that should the lowest point on the spool be adjacent one of the flanges 24ª of the spool 24, then as the line 30 pulls the lip 8 down towards that point, the plate will not only tilt or pivot but will also slide axially along the flange post 28 until the line 30 is directly over the lowest point of the trough. In this manner the plate undergoes a continual sculling action during reeling in of the line 30 such that a substantially even spool of line is achieved.

The radius of the juncture between the guide walls 6 and lip 8 of the channel is sufficiently large enough to provide a smoothly rounded surface to prevent trapping of the line 30 at either of these two points. Likewise, the rearwardly facing corners of the lip 8 should be slightly rounded as a sharply square corner will cause the lip to bite into the spooled line 32 and urge the device to remain in a tilted position.

Preferably, the channel 4 is progressively narrower from the loop 10 of the plate towards the lip 8. This tapered shape will prevent the line 30 from coming into contact with the medial portions of the guide walls 6 and to ensure that the line 30 can reach the corners of the lip 8 for the most sensitive following action of the plate.

When using tackle equipped with the present invention for casting, such as in surf casting, it is desirable to have the level wind plate 2 entirely disengaged from the spooled line to prevent possible jamming of the line 30 as it is rapidly pulled from between the tightly spooled lines 32. In such instances the plate 2 will automatically flip completely forward with the throw of the rod to assume the position indicated by broken lines in FIGURE 1.

Several of today's monofilament type lines have been known to break the spool flanges 24ª due to the tendency of mono-line to stretch when reeled in tightly on the spool. The inherent resilience of the line will then tend to cause bulging of the line sideways since the top layers of the line are pressing inwardly toward the hub of the spool. It has been found that a slight crowning of the spooled line 32 will aid in reducing this lateral pressure built up by monofilament lines. The present invention achieves this effect as shown in FIGURE 5 due to the continual tilting and sliding of the plate from right to left. Preferably the lip 8 of the plate should be at least half as wide as the distance between the spool flanges 24ª. In this way one portion of the lip will always overlie the center of the spooled line 32 so that the lip cannot become trapped within an extremely deep trough.

I claim:

1. In a winding and reeling apparatus having side frames held in spaced relationship by posts and including a spool carrying a line supply and journalled between said side frames, a line winding attachment comprising a plate mounted between said side frames, said plate including an arcuate body portion over which a strand of said line supply is guided and having at one end thereof a lip in engagement with said line supply, said lip having a transverse dimension substantially greater than the diameter of a strand of said line supply, means at the opposite end of said body portion for movably attaching said plate to one of said posts to provide a combined traversing and wobbling action of said plate during winding of the line supply, and guide means adjacent said lip for engaging and controlling the winding of a strand of said line supply upon said spool.

2. In a line reel having side frames spaced apart by posts, a spool mounted between said frames and carrying a line supply having a single line feeding off of said spool, a line winding attachment carried between said frames and comprising, an arcuate body portion having a radius larger than the radius of said spool, snap-on mounting means at one end of said body portion for attaching said body portion to one of said posts to provide a combined traversing and wobbling action of said plate during reeling of the line supply, a floating lip at the other end of said body portion and having a width substantially greater than the diameter of the line being reeled, and disposed beneath said single line at its point of convergence with said line supply, and guide means associated with said lip whereby as the spool is rotated to reel in said single line, a crown is formed immediately beneath said lip at said line and a trough is formed in said line supply adjacent said crown such that said lip will be tilted into said trough and said single line will be drawn into the trough.

3. A line winding attachment according to claim 2, wherein said body mounting means includes an elongated loop having an internal dimension substantially greater than the diameter of said posts to allow vertical movement of said body portion whereby, reeling in of said single line will draw said lip into the point of convergence of said single line and line supply and playing out of said single line will push said lip away from said point of convergence.

References Cited in the file of this patent

UNITED STATES PATENTS

| 1,151,349 | Flegel | Aug. 24, 1915 |
| 2,243,624 | Gazet | May 27, 1941 |

FOREIGN PATENTS

| 1,026,184 | France | Feb. 4, 1953 |